United States Patent [19]

Orzel

[11] 3,945,686
[45] Mar. 23, 1976

[54] BLEND BACK PROPORTIONING VALVE

[75] Inventor: Edward S. Orzel, Cleveland, Ohio

[73] Assignee: The Weatherhead Company, Cleveland, Ohio

[22] Filed: Nov. 29, 1973

[21] Appl. No.: 419,998

[52] U.S. Cl............ 303/6 C; 137/505.25; 188/349; 200/82 D; 303/84 A
[51] Int. Cl.² .......................................... B60T 8/26
[58] Field of Search....... 303/6 C, 6 R, 84; 188/349, 188/151 A; 340/52 C; 200/82 D; 137/505.25, 87

[56] References Cited
UNITED STATES PATENTS

| | | |
|---|---|---|
| 3,598,451 | 8/1971 | Doerfler............................ 303/6 C |
| 3,637,963 | 1/1972 | Wellmann..................... 303/6 C X |
| 3,672,728 | 6/1972 | Keady et al. ...................... 303/6 C |
| 3,701,567 | 10/1972 | Shutt et al........................... 303/6 C |
| 3,706,477 | 12/1972 | Stelzer .............................. 303/6 C |
| 3,712,683 | 1/1973 | Keady et al. ....................... 303/6 C |
| 3,727,989 | 4/1973 | Keady.............................. 188/349 X |
| 3,734,570 | 5/1973 | Stelzer ................................ 303/6 C |
| 3,801,159 | 4/1974 | Fulmer................................ 303/6 C |
| 3,806,200 | 4/1974 | Fulmer................................ 303/6 C |

Primary Examiner—Trygve M. Blix
Assistant Examiner—Douglas C. Butler
Attorney, Agent, or Firm—McNenny, Farrington, Pearne & Gordon

[57] ABSTRACT

A motor vehicle hydraulic brake system includes a front brake circuit and a rear brake circuit. The rear brake circuit includes a blend back proportioning valve which controls the pressure in the rear brake circuit. The blend back proportioning valve includes a proportioning piston which cooperates with a valve seat to maintain increases in rear brake pressure proportional to but less than increases in master cylinder pressure between a first predetermined pressure and a second predetermined pressure. A blend back spool moves the valve seat away from the proportioning piston to equalize master cylinder pressure and rear brake pressure when the second predetermined pressure is reached.

3 Claims, 4 Drawing Figures

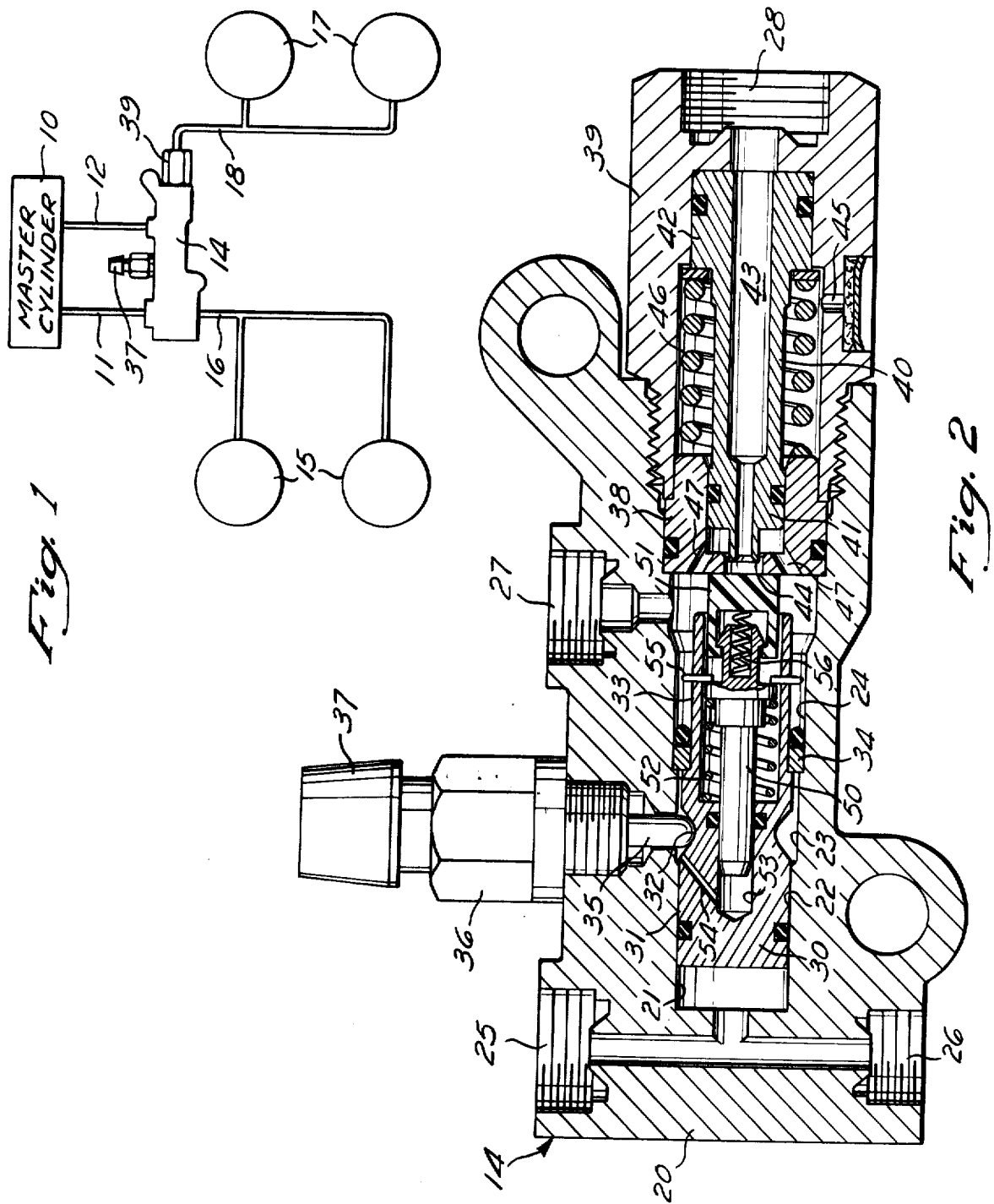

BLEND BACK PROPORTIONING VALVE

BACKGROUND OF THE INVENTION

Hydraulic brake systems for motor vehicles are commonly dual systems in which the front brake circuit is hydraulically isolated from the rear brake circuit so that a failure in one of the circuits does not impede operation of the other circuit. It has been recognized that, due to weight transfer of the vehicle from the rear wheels to the front wheels during braking, it is desirable to provide a lower pressure to the rear wheel brakes than is provided to the front wheel brakes. To provide this function, a fluid pressure proportioning valve is sometimes placed in the rear brake circuit between the master cylinder and the slave cylinders of the rear wheel brakes to maintain increases in the rear wheel brake pressure proportional to but less than increases in the front wheel brake pressure. One such prior art proportioning valve is disclosed in U.S. Pat. No. 3,623,776 to Ellis M. Wellman, and another is disclosed in U.S. Pat. No. 3,667,810 to Richard J. Silagy.

It has also been recognized in the art that, under certain conditions, it is desirable to equalize the rear brake pressure with the front brake pressure under very severe braking conditions. To perform this function, the art has provided various blend back proportioning valves which reduce the fluid pressure increases in the rear brake pressure over one range of pressures and which equalize front and rear brake pressures under very severe braking conditions.

SUMMARY OF THE INVENTION

The present invention provides a novel blend back proportioning valve. The valve includes a housing having an inlet port, an outlet port, and a bore extending between the inlet port and the outlet port. A proportioning piston is slidably disposed in the bore between the inlet port and the outlet port, and the proportioning piston includes a smaller diameter portion exposed to inlet port pressure and a larger diameter portion exposed to outlet port pressure. A fluid flow passage extends from one end through the proportioning piston, and an annular valve member on the one end of the proportioning piston surrounds the fluid flow passage for controlling flow from the inlet port to the outlet port.

A blend back spool is also slidably disposed in the bore, and the blend back spool includes a valve seat. The valve seat is spaced from the annular valve member to open the fluid flow passage when the fluid pressure in the inlet port is less than the first predetermined pressure. The valve member is movable by the proportioning piston to a position adjacent the valve seat to at least partially close the fluid flow passage when the first predetermined pressure is reached and to maintain increases in outlet port pressure proportional to but less than increases in inlet port pressure when the inlet port pressure is greater than the first predetermined pressure and is less than the second predetermined pressure.

The blend back spool includes a net lateral cross-sectional area exposed to inlet port pressure, and a spring having a predetermined spring rate biases the blend back spool and the valve seat toward the valve member. When the second predetermined pressure is reached, the inlet port pressure acting against the area of the blend back spool exposed to inlet port pressure causes the blend back spool to move the valve seat away from the annular valve member to equalize the fluid pressures in the inlet port and the outlet port.

In a first embodiment, the blend back spool includes another net lateral cross-sectional area exposed to atmospheric pressure facing in a direction opposite the direction of the area exposed to inlet port pressure. This results in quick movement of the valve seat by the blend back spool away from the annular valve member to equalize inlet and outlet port pressures.

In a second embodiment, the blend back spool includes another net lateral cross-sectional area exposed to outlet port pressure facing in a direction opposite the direction of the area exposed to inlet port pressure. This second embodiment results in slower movement of the valve seat by the blend back spool away from the annular valve member to equalize inlet and outlet port pressures over a range of inlet port pressures after the second predetermined inlet port pressure is reached. This second embodiment also includes a passage extending through the valve seat and through the blend back spool establishing fluid pressure communication between the other area and the outlet port pressure.

BRIEF DESCRIPTION OF THE DRAWINGS

These and other aspects, principles, and advantages of the present invention are incorporated in a first and second preferred embodiment of the invention shown in the drawings, wherein:

FIG. 1 is a schematic diagram of a motor vehicle hydraulic brake system according to the principles of the invention;

FIG. 2 is an enlarged, side elevational, cross-sectional view of a first preferred embodiment of the blend back proportioning valve used in the system shown in FIG. 1;

DESCRIPTION OF THE PREFERRED EMBODIMENTS

Figures 3, 4:
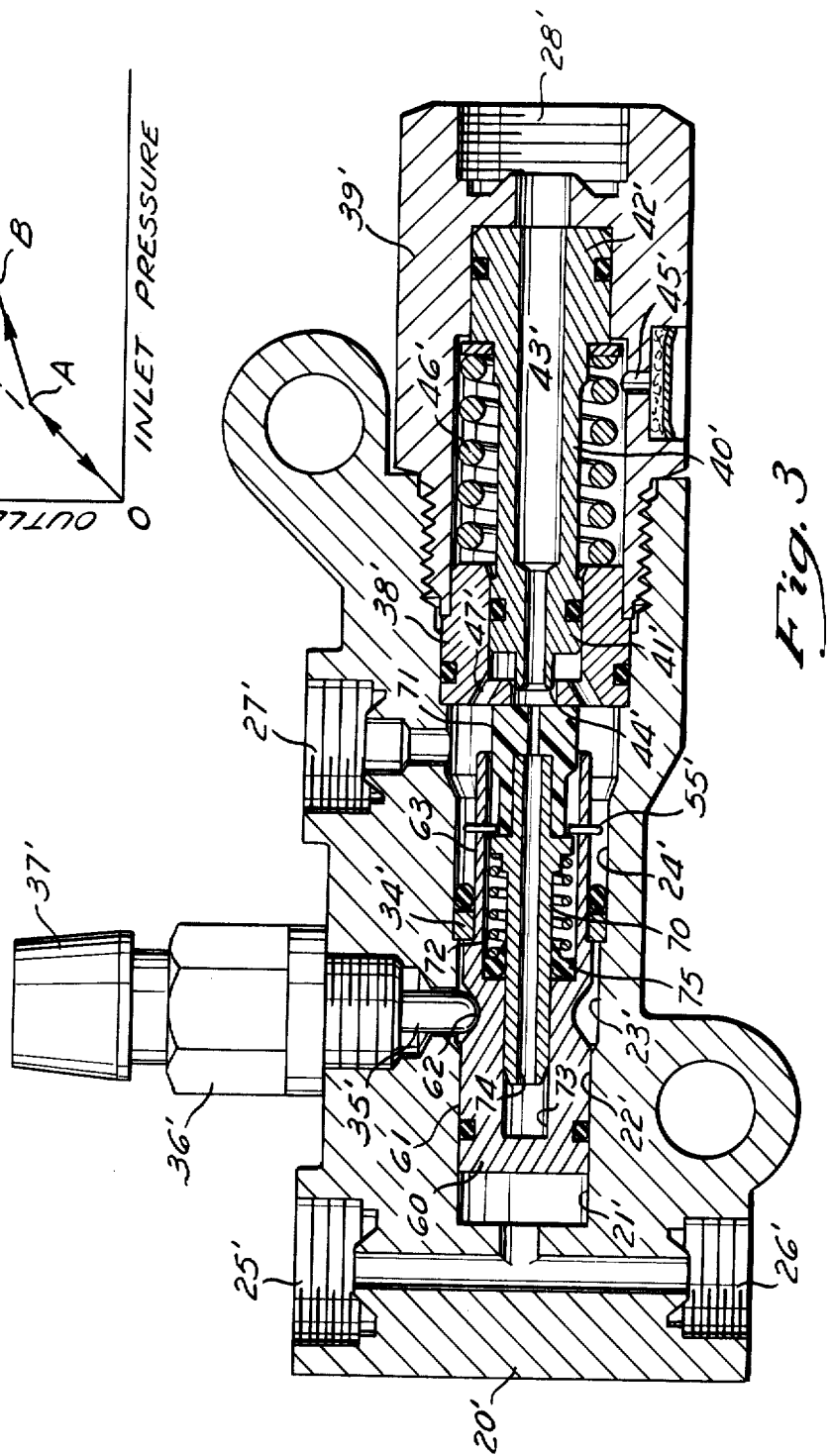
FIG. 3 is an enlarged, side elevational, cross-sectional view of a second preferred embodiment of the blend back proportioning valve used in the system shown in FIG. 1.
FIG. 4 is a graphical representation of the relationship between inlet and outlet pressures of the blend back proportioning valves shown in FIGS. 2 and 3.

Referring to the drawings in greater detail, the schematic circuit diagram shown in FIG. 1 includes a dual master cylinder 10 having a front brake circuit supply line 11 and a rear brake circuit supply line 12 for separately supplying fluid pressure to the front brake circuit and the rear brake circuit. The pressure in the lines 11 and 12 is equal under all operating conditions except when there is a failure in either the front brake circuit or the rear brake circuit. The lines 11 and 12 lead to a combination warning switch and blend back proportioning valve 14, and the combination unit 14 supplies fluid pressure to the slave cylinders of the front wheels 15 through the line 16 and to the slave cylinders of the rear wheels 17 through a line 18. First and second embodiments of the combination unit 14 for the circuit shown in FIG. 1 are shown in FIGS. 2 and 3, respectively.

First Embodiment

As shown in FIG. 2, the first embodiment of the combination unit 14 includes a housing 20 which is preferably machined from extruded brass stock. A stepped bore 21 extends axially from end to end through the housing 20, and the bore 21 includes a smaller diameter portion 22, an intermediate diameter portion 23, and a larger diameter portion 24. On the left side of the housing 20, a front brake inlet port 25 is hydraulically connected to the front brake supply line 11, and a front brake outlet port 26 is hydraulically connected to the line 16. On the right side of the housing 20, a rear brake inlet port 27 is hydraulically connected to the rear brake supply line 12 and a rear brake outlet port 28 is hydraulically connected to the line 18.

A single piece warning switch piston 30 is slidably disposed in the axial bore 21. The warning switch piston 30 includes a left portion 31 sealingly disposed in the smaller diameter portion 22, a reduced diameter central portion 32, and a right portion 33. An annular centering sleeve 34 is slidably disposed in the larger diameter bore portion 24 and is slidably axially relative to the warning switch piston 30. Suitable seals are provided to prevent fluid leakage between left portion 31 and the smaller diameter bore portion 22 and between the right portion 33 and the larger diameter bore portion 24.

The warning switch piston 30 operates in a well known manner. The pressures in the front brake inlet port 25 and the rear brake inlet port 27 are equal under all conditions except when there is a failure in either the front brake circuit or the rear brake circuit. Under these normal operating conditions, the equal pressures acting on the left piston portion 31 and on the right piston portion 33 and on the centering sleeve 34 hold the warning switch piston 30 in the position shown in FIG. 2. This is because the area exposed to fluid pressure acting to the left on the warning switch piston 30 is the sum of the lateral cross-sectional area of the portion 33 and the lateral cross-sectional area of the sleeve 34. This area is greater than the area of the piston portion 31 acting to the right on the warning switch piston 30, so that the warning switch piston 30 and the sleeve 34 are urged to the left viewed in FIG. 2. However, the sleeve 34 engages a shoulder at the junction of the bore portions 23 and 24 to prevent such leftward movement so that the switch piston 30 is held in its center position shown in FIG. 2.

If there is a failure in the front circuit, the rear brake pressure acting on the right end portion 33 will move the switch piston 30 to the left as veiwed in FIG. 2. The sleeve 34 does not move to the left with the switch piston 30 because movement of the sleeve 34 to the left is prevented by the shoulder at the junction of the bore portions 23 and 24. This causes a warning switch plunger 35 of a switch assembly 36 to move upwardly out of the reduced diameter center portion 32. This upward movement of the plunger 35 electrically connects a warning switch terminal 37 of the switch assembly 36 to a ground connection through the housing 20. The terminal 37, in a well known manner, is electrically connected to the ground side of a warning indicator (not shown) so that such upward movement of the plunger 35 actuates the warning indicator. After the front brake circuit has been repaired, so that equal pressures are supplied again to the inlet ports 25 and 27, such pressures move the warning switch piston 30 back to the center position shown in FIG. 2 because the lateral cross-sectional area of the left portion 31 is greater than the lateral cross-sectional area of the right portion 33. This causes the plunger 35 to again move to the reduced diameter center portion 32 to deactuate the warning indicator.

In a similar manner, when there is a failure in the rear circuit, the pressure in the front circuit acts against the left end portion 31 and pushes the switch piston 30 and sleeve 34 to the right to actuate the warning indicator. After the rear circuit has been repaired so that the pressures supplied to the inlet ports 25 and 27 are equal, the switch piston 30 is moved back to the center position shown in FIG. 2 because the lateral cross-sectional area of the sleeve 34 plus the lateral cross-sectional area of the right end portion 33 is greater than the lateral cross-sectional area of the left end portion 31.

The right side of the housing 20 as viewed in FIG. 2 includes a first insert 38 and a second insert 39. The insert 39 holds the insert 38 stationary in the axial bore 21. The inserts 38 and 39 are considered as part of the housing 20, but are made as separate pieces for assembly of the various components of the blend back proportioning valve.

A proportioning piston 40 is slidably disposed in the right end of the axial bore 21. The proportioning piston 40 includes a smaller diameter portion 41 exposed to the pressure in the inlet port 27 and a larger diameter portion 41 exposed to pressure in the outlet port 28. A fluid flow passage 43 extends axially from the left end of the proportioning piston 40 for establishing fluid pressure communication between the inlet port 27 and the outlet port 28. An annular valve member 44 is formed by the left end of the proportioning piston 40 surrouding the fluid flow passage 43. The lateral cross-sectional area differential of the proportioning piston 40 (i.e., the difference between the lateral cross-sectional area of the larger diameter portion 42 and the lateral cross-sectional area of the smaller diameter portion 41) is exposed to atmospheric pressure through an atmospheric vent passage 45 in the second insert 39. A suitable dust cap is provided in the vent passage 45 to prevent contaminants from entering the right side of the axial bore 21. A plurality of passages 47 in the insert 38 maintain open fluid pressure communication between the inlet port 26 and the valve member 44.

A first spring 46 acts between the first insert 38 of the housing 20 and the proportioning piston 40 to hold the proportioning piston 40 in the position shown in FIG. 2 when the master cylinder 10 of the brake system is deactuated. The first spring 46 has a predetermined preload to prevent movement of the proportioning piston 40 from the position shown in FIG. 2 until first predetermined inlet and outlet pressures are reached, as more fully explained below.

A blend back spool 50 is carried by the switch piston 30 and includes a valve seat 51 which may be formed of nylon or other suitable material. A second spring 52 acts between the warning switch piston 30 and the blend back spool 50 to urge the blend back spool 50 and the valve seat 51 to the position shown in FIG. 2. The second spring 52 has a predetermined preload, so that the blend back spool 50 cannot pull the valve seat 51 to the left until second predetermined inlet and outlet port pressures are reached, as explained in detail below. The left end of the blend back spool 50 is slidably carried by a blind bore 53 in the warning switch piston 30. A vent passage 54 extends radially outward from the blind bore 53 to the central portion 32 of the warning switch piston 30 to vent the left end of the blend back spool 50 to atmospheric pressure through the warning switch assembly 36 under all conditions. A C-shaped spring clip 55 is also provided to prevent the second spring 52 from pushing the blend back spool 50 and the valve seat 51 out of the switch piston 30 in which they are disposed in the event of movement of the switch piston 30 the left, as described above. The valve seat 51 is resiliently mounted on the blend back spool 50 and is biased to the right by a light biasing spring 56.

Turning now to the operation of the blend back proportioning valve shown in FIG. 2, it should first be understood that movement of the switch piston 30 to the left as viewed in FIG. 2 caused by a fluid pressure failure in the front brake circuit in the manner described above moves the valve seat 51 to the left away from the valve member 44. This renders the blend back proportioning valve inoperable and establishes open fluid pressure communication between the inlet port 27 and the outlet port 28 through the flow passage 43 at all pressures, to provide full braking pressure to the rear wheel brakes in the event of a failure in the front wheel brakes. After the front brake circuit has been repaired, the switch piston 30 moves back to the position shown in FIG. 2, and the blend back proportioning valve operates in the manner described below.

Under low pressure application of pressure from the master cylinder 10 to the blend back proportioning valve inlet port 27, the preload of the first spring 46 holds the proportioning piston 40 in the position shown in FIG. 2 so that the valve member 44 is axially spaced from the valve seat 51 and open fluid pressure communication from the inlet port 27 to the outlet port 28 is maintained through the flow passages 47 and through the flow passage 43. This portion of the operation of the blend back proportioning valve is represented by line OA in FIG. 4.

When the inlet and outlet port pressures reach a first predetermined pressure at point A in FIG. 4, the proportioning piston 40 moves to the left against the force of the spring 46. This is because the force created by the outlet port pressure acting on the larger diameter portion 42 to the left is greater than the force created by the inlet port pressure acting on the smaller diameter portion 41 to the right. When this unbalanced force becomes great enough to overcome the preload of the first spring 46, the proportioning piston 40 moves to the left until the valve member 44 moves close enough to the valve seat 51 to throttle fluid flow from the inlet port 27 to the outlet port 28. If fluid is flowing from the inlet port 27 to the outlet port 28, the valve member 44 will be slightly spaced from the valve seat 51 to throttle such fluid flow, but if there is no flow from the inlet port 27 to the outlet port 28 the valve member 44 will engage the valve seat 51. The blend back proportioning valve, however, functions in the same manner whether or not there is fluid flow through the valve.

As the inlet port pressure continues to increase above point A in FIG. 3, the proportioning piston 40 maintains increases in outlet port pressure proportional to but less than increases in inlet port pressure. This is because the area of the portion 41 exposed to inlet port pressure is less than the area of the portion 42 exposed to outlet port pressure. This portion of the operation of the valve is shown by line AB in FIG. 4. The proportional relationship between the increase in inlet pressure and the increase in outlet pressure during this portion of the operation of the valve is the slope of the line AB and is equal to the proportional relationship between the area of the smaller diameter portion 41 exposed to inlet port pressure and the area of the larger diameter portion 42 exposed to outlet port pressure. During this portion of the operation of the blend back proportioning valve along line AB, the preload of the second spring 52 retains the blend back spool 50 and its valve seat 51 in the position shown in FIG. 2.

When the second predetermined inlet and outlet port pressures indicated at point B in FIG. 4 are reached, the preload of the second spring 52 is overcome by the inlet port pressure acting against the right end of the blend back spool 50. When this occurs, the blend back spool 50 moves to the left and moves its valve seat 51 away from the valve member 44. This momentarily opens fluid pressure communication between the inlet port 27 and the outlet port 28 through the passages 47 and 43. Because there is substantially no further movement of the brake shoes or pads of the rear wheels 17 when this occurs there is substantially no flow of fluid from the inlet port 27 to the outlet port 28 and the outlet port pressure is immediately increased. This increased outlet port pressure acts on the larger diameter portion 42 and moves the proportioning piston 40 to the left toward the valve seat 51. Further increases in inlet port pressure move the blend back spool 50 further to the left and further increases in outlet port pressure move the proportioning piston 40 further to the left until the blend back spool 50 is in its left most position in the blind bore 53 and the proportioning piston 40 engages the annular shoulder in the left end of the insert 38. When the spool 50 and piston 40 are in these positions, the valve seat 51 is spaced from the valve member 44 to equalize inlet and outlet port pressures. This portion of the operation of the blend back proportioning valve is shown by the very steep line BC in FIG. 4.

As the pressure in the inlet port 27 increases above the pressure indicated at point C in FIG. 4, such increased pressure holds the valve seat 51 of the blend back spool 50 to the left away from the valve member 44 so that the blend back spool 50 maintains further increases in outlet port pressure equal to further increases in inlet port pressure as the pressures increase along line CE in FIG. 4.

When point E is reached in FIG. 4 and the brakes are released, the inlet and outlet port pressures decrease along the line ECAO. Along line EC, the valve seat 51 is held to the left against the bias of the second spring 52 away from the valve member 44 by the inlet port pressure. At point C, the force of the inlet port pressure acting against the blend back spool 50 becomes less than the force of the spring 52 so that the spring 52 forces the blend back spool 50 and its valve seat 51 back to the right against the valve member 44 to isolate the inlet port 27 from the outlet port 28. A further decrease in inlet port pressure from point C causes the outlet port pressure to move the valve seat 51 slightly to the left away from the valve member 44 against the light bias of the spring 56 so that the valve seat 51 acts as a one-way check valve to permit decreases in inlet port pressure to be met with equal decreases in outlet port pressure along line CA. When point A is reached, the proportioning piston 40 returns to the right position shown in FIG. 2, and further decreases in inlet port pressure result in equal decreases in outlet port pressure along line AO. It should be understood that, along line CA, the pressures in the outlet port will be slightly greater than the pressures in the inlet port by a pressure equal to the effective pressure of the spring 56. Because this difference is relatively small and for purposes of simplication, line ECAO has been shown as a straight line in FIG. 4 although it should be understood that it is not exactly straight.

Second Embodiment

As shown in FIG. 3, the second embodiment of the combination unit 14 is structurally identical in many respects to the first embodiment shown in FIG. 2. Those parts of the second embodiment shown in FIG. 3 which are identical structurally to the first embodiment shown in FIG. 2 are identified by the same reference numeral as in FIG. 2 but followed by a prime.

The only parts of the second embodiment shown in FIG. 3 which differ structurally from the first embodiment shown in FIG. 2 are the warning switch, blend back spool, and valve seat. As shown in FIG. 3, the second embodiment includes a warning switch piston 60. The warning switch piston 60 includes a left portion 61 sealingly disposed in the smaller diameter bore portion 22', a reduced diameter central portion 62, and a right portion 63. The annular centering sleeve 34' is slidably disposed in the larger diameter portion 24' and is slidable axially relative to the warning switch piston 60. Suitable seals are provided to prevent fluid leakage between the left portion 61 and the smaller diameter bore portion 22' and between the right portion 63 and the larger diameter bore portion 24'. The operation of the warning switch 60 is the same as the operation of the warning switch 30 described above with reference to FIG. 2.

A blend back spool 70 is carried by the switch piston 60 and includes a valve seat 71 which may be formed of nylon or other suitable material. A second spring 72 acts between the warning switch piston 60 and the blend back spool 70 to urge the blend back spool 70 and the valve seat 71 to the position shown in FIG. 3. The second spring 72 has a predetermined preload, so that the blend back spool 70 cannot pull the valve seat 71 to the left until a predetermined inlet port pressure is reached, as explained in detail below. The left end of the blend back spool 70 is slidably carried by a blind bore 73 in the warning switch piston 60. An axially extending passage 74 extends from end to end through the valve seat 71 and through the blend back spool 70. A one-way seal 75 prevents fluid leakage from the inlet port 27' to the outlet port 28' between the warning switch piston 60 and the blend back spool 70.

Turning now to the operation of the second embodiment shown in FIG. 3, such operation is the same as the operation of the first embodiment shown in FIG. 2 along line OA and along line AB in FIG. 4. This operation has been described in detail above with particular reference to FIG. 2. During this portion of the operation of the valve shown in FIG. 3, the preload of the second spring 72 holds the blend back spool 70 and its valve seat 71 in the position shown in FIG. 3.

The diameter of the annular valve member 44' is less than the diameter of the left end of the blend back spool 70 which rides in the blind bore 73. Because of this, an annular cross-sectional area of the blend back spool 70 equal to the difference between the smaller diameter of the valve member 44' and the larger diameter of the left end of the blend back spool 70 is exposed to pressure in the inlet port 27'. Similarly, and because the axial passage 74 establishes open fluid pressure communication between the left end of the blend back spool 70 and the pressure in the outlet port 28', an annular cross-sectional area of the blend back spool 70 equal to the difference between the smaller diameter of the annular valve member 44' and the larger diameter of the left end portion of the blend back spool 70 is exposed to pressure in the outlet port 28'. Thus, when the valve member 44' engages the valve seat 71 along line AB, the blend back spool 70 has a net annular area exposed to inlet port pressure facing in a direction to urge the valve seat 71 away from the valve member 44' and an equal net area exposed to outlet port pressure (which is lower than inlet port pressure along line AB) facing in a direction opposite thereto.

When the second predetermined inlet and outlet port pressures shown at point B are reached, the higher pressure in the inlet port 27' acting against the net area of the blend back spool 70 exposed to inlet port pressure overcomes the force of the spring 72 and the force of the lower outlet port pressure acting on the net area of the spool 70 exposed to outlet port pressure. This causes movement of the blend back spool 70 and its valve seat 71 to the left as viewed in FIG. 3 to momentarily separate the valve seat 71 from the annular head 44'. Because there is substantially no further movement of the brake shoes or pads of the rear wheels 17 when this occurs, there is substantially no flow of fluid from the inlet port 27' to the outlet port 28' and the outlet port pressure is immediately increased. This increased outlet port pressure acts on the larger diameter portion 42' and moves the proportioning piston 40' to the left toward the valve seat 71. Quick equalization of inlet and outlet port pressures is prevented in the second embodiment because this increase in the outlet port pressure also acts on the net area of the blend back spool 70 exposed to outlet port pressure to urge the valve seat 71 back to the right against the valve member 44'. Because of this, the equalization of blending back of inlet and outlet port pressures occurs over a wide range of inlet port pressure increases along line BD in FIG. 4. This is to be distinguished from the first embodiment shown in FIG. 2, wherein equalization or blending back of inlet and outlet port pressures occurs more quickly along the line BC which is steeper than the line BD. When the pressure in the inlet port 27' and the outlet port 28' of the second embodiment increases along line BD, the proportioning piston 40' is moved to the left by the increased outlet port pressure acting against the larger diameter portion 42' until the proportioning piston 40 is stopped by engagement with the shoulder in the left end of the insert 38'.

The slope of the line BD is determined by the speed of movement of the blend back spool 70 and proportioning piston 40 as they move back together after they are separated by an increased inlet port pressure. This speed of movement is slowed by friction forces so that the outlet port pressure increases by a greater amount than the increase in inlet port pressure before the valve seat 71 re-engages the valve member 44', as indicated in FIG. 4 by the slope of the line BD being greater than 45' so that the outlet port pressure approaches the inlet port pressure.

As the pressure in the inlet port 27' increases above the pressure indicated at point D in FIG. 4, the inlet and outlet port pressures are equalized. This is because the proportioning piston 40' cannot move further to the left after it engages the annular shoulder in the insert 38' and because, when the inlet port pressure is increased above point D to move the valve seat 71 away from the valve member 44', the valve seat 72 is unable due to friction forces to move back to the right fast enough to engage the valve member 44' before the outlet port pressure increases to the same pressure as the inlet port pressure. This operation of the blend back proportioning valve continues until the operator releases the brakes at point E in FIG. 4.

When point E is reached in FIG. 4 and the brakes are released, the pressures decrease along line EDAO. This is because the seal 75 between the warning switch piston 60 and the left end of the blend back spool 70 provides a one-way check valve so that decreases in inlet port pressure are met with corresponding decreases in outlet port pressure. Line EDA is parallel to but slightly spaced above line AO due to the spring force required to open the seal 75, but because this difference is relatively small and for purposes of simplification, line EDAO has been shown as a straight line in FIG. 4 although it should be understood that it is not exactly straight.

What is claimed is:

1. A blend back proportioning valve comprising a housing having an inlet port, an outlet port, a bore in said housing between said inlet port and said outlet port and extending beyond said inlet port in a direction away from said outlet port, switch piston means slidably disposed in said bore for movement in response to a fluid pressure unbalance on opposite ends of said switch piston means, said switch piston means including a blind cylindrical chamber extending axially from one of its ends, said blind cylindrical chamber within said switch piston means including a larger diameter portion adjacent said one end and a smaller diameter portion spaced away from said one end, proportioning piston means slidably disposed in said bore between said inlet port and said outlet port in axially aligned relation to said switch piston means, said proportioning piston means having a smaller lateral cross-sectional area exposed to inlet port pressure and a larger lateral cross-sectional area exposed to outlet port pressure, a first spring biasing said proportioning piston means toward said outlet port, a fluid flow passage extending from one end of said proportioning piston means at least partially through said proportioning piston means establishing fluid pressure communication between said inlet port and said outlet port, said proportioning piston means including an annular portion on said one end surrounding said fluid flow passage and defining an annular valve member, blend back spool means slidably carried in said blind cylindrical chamber of said switch piston means, said blend back spool means including a larger diameter portion disposed in said larger diameter portion of said blind cylindrical chamber and a smaller diameter portion sealingly disposed in said smaller diameter portion of said blind cylindrical chamber, said smaller diameter portion of said blind cylindrical chamber being vented to atmospheric pressure and said smaller diameter portion of said blend back spool means including a net lateral cross-sectional area exposed to atmospheric pressure under all conditions, a spring disposed in said larger diameter portion of said blind cylindrical chamber exteriorly of said blend back spool means, said spring acting against said larger diameter portion of said blend back spool means to urge said blend back spool means in a direction toward said annular valve member, a valve seat slidably carried on said blend back spool means adjacent said larger diameter portion of said blend back spool means, another spring carried by said blend back spool means and acting against said valve seat to urge said valve seat in a direction toward said annular valve member, said valve seat being spaced from said annular valve member to open said fluid flow passage when the fluid pressure in said inlet port is less than a first predetermined pressure, said proportioning piston means moving said annular valve member to a position adjacent said valve seat to at least partially close said fluid flow passage when said first predetermined pressure is reached, said proportioning piston means maintaining increases in outlet port pressure proportional to but less than increases in inlet port pressure when said inlet port pressure is greater than said first predetermined pressure and is less than a second predetermined pressure, and said blend back spool means moving said valve seat away from said valve member when said second predetermined pressure is reached in said inlet port to equalize the fluid pressures in said inlet port and said outlet port.

2. A blend back proportioning valve as defined in claim 1 wherein said larger diameter portion of said blend back spool means includes a net lateral cross-sectional area exposed to inlet port pressure, and said net area of said blend back spool means exposed to inlet port pressure faces in a direction to urge said blend back spool means away from said annular valve member.

3. A blend back proportioning valve as defined in claim 2 wherein said first mentioned spring has a predetermined preload, and the force exerted by said second predetermined inlet port pressure acting on said net area of said blend back spool means exposed to inlet port pressure moves said blend back spool and said valve seat against said preload of said spring away from said valve member.

* * * * *

UNITED STATES PATENT AND TRADEMARK OFFICE
CERTIFICATE OF CORRECTION

PATENT NO. : 3,945,686
DATED : March 23, 1976
INVENTOR(S) : Edward S. Orzel

It is certified that error appears in the above-identified patent and that said Letters Patent are hereby corrected as shown below:

Column 3, line 39, after "left" insert --as--.

Column 4, line 24, "41" should read --42--.

Column 4, line 30, "surrouding" should read --surrounding--.

Column 8, line 22, after "annular" insert --valve--.

Column 8, line 44, "increases" should read --increase--.

Column 8, line 59, "45'" should read --45°--.

Column 8, line 68, "72" should read --71--.

Signed and Sealed this

Tenth Day of August 1976

[SEAL]

Attest:

RUTH C. MASON
*Attesting Officer*

C. MARSHALL DANN
*Commissioner of Patents and Trademarks*